(No Model.) 4 Sheets—Sheet 1.

H. P. DAVIS.
CONTROLLER FOR ELECTRIC MOTORS.

No. 574,885. Patented Jan. 12, 1897.

WITNESSES:  
INVENTOR  
Harry P. Davis  
BY  
Terry MacKaye Harr  
ATTORNEYS.

(No Model.) 4 Sheets—Sheet 2.
H. P. DAVIS.
CONTROLLER FOR ELECTRIC MOTORS.
No. 574,885. Patented Jan. 12, 1897.
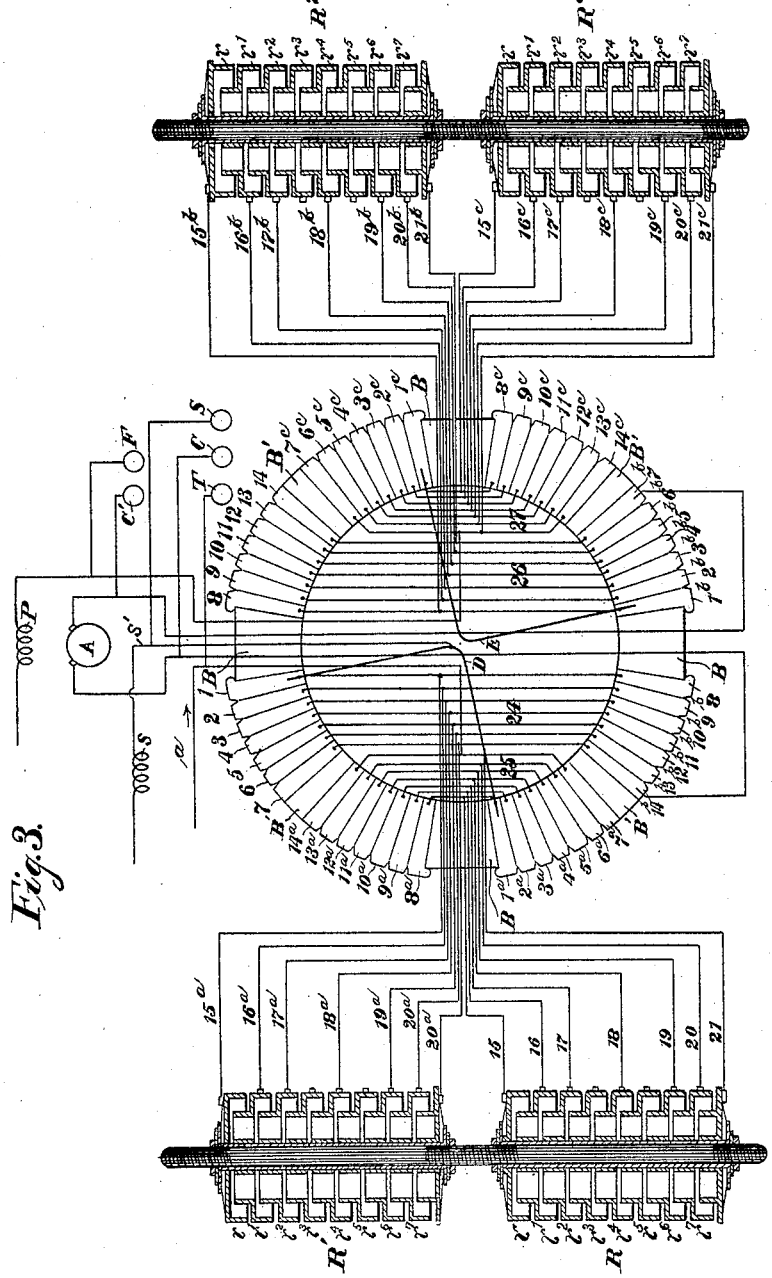
WITNESSES:
INVENTOR
Harry P. Davis
BY
Terry, MacKay & Carr
ATTORNEYS.

(No Model.) 4 Sheets—Sheet 3.
H. P. DAVIS.
CONTROLLER FOR ELECTRIC MOTORS.
No. 574,885. Patented Jan. 12, 1897.
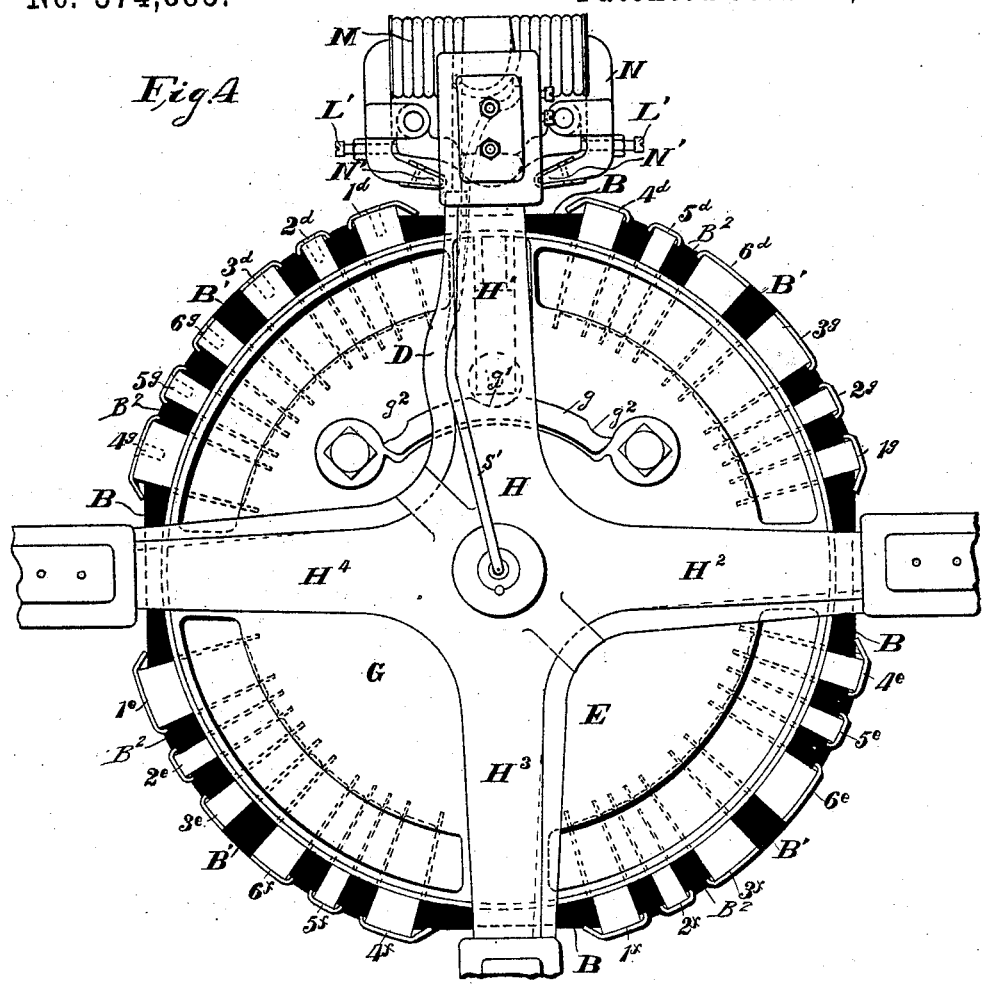
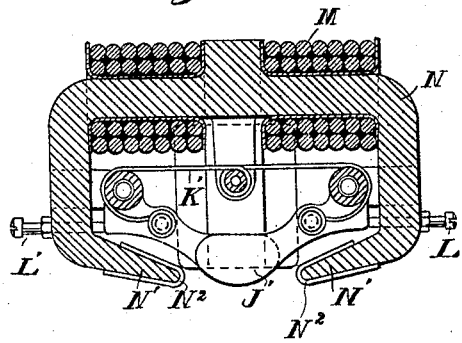
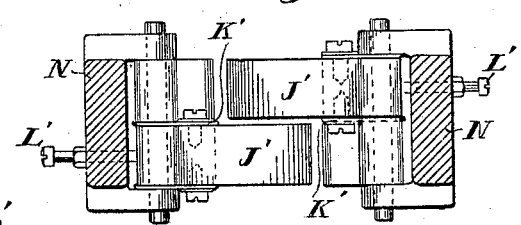
WITNESSES: INVENTOR,
Harry P. Davis
BY
Kerry, MacKay & Carr
ATTORNEYS.

(No Model.) 4 Sheets—Sheet 4.
H. P. DAVIS.
CONTROLLER FOR ELECTRIC MOTORS.
No. 574,885. Patented Jan. 12, 1897.
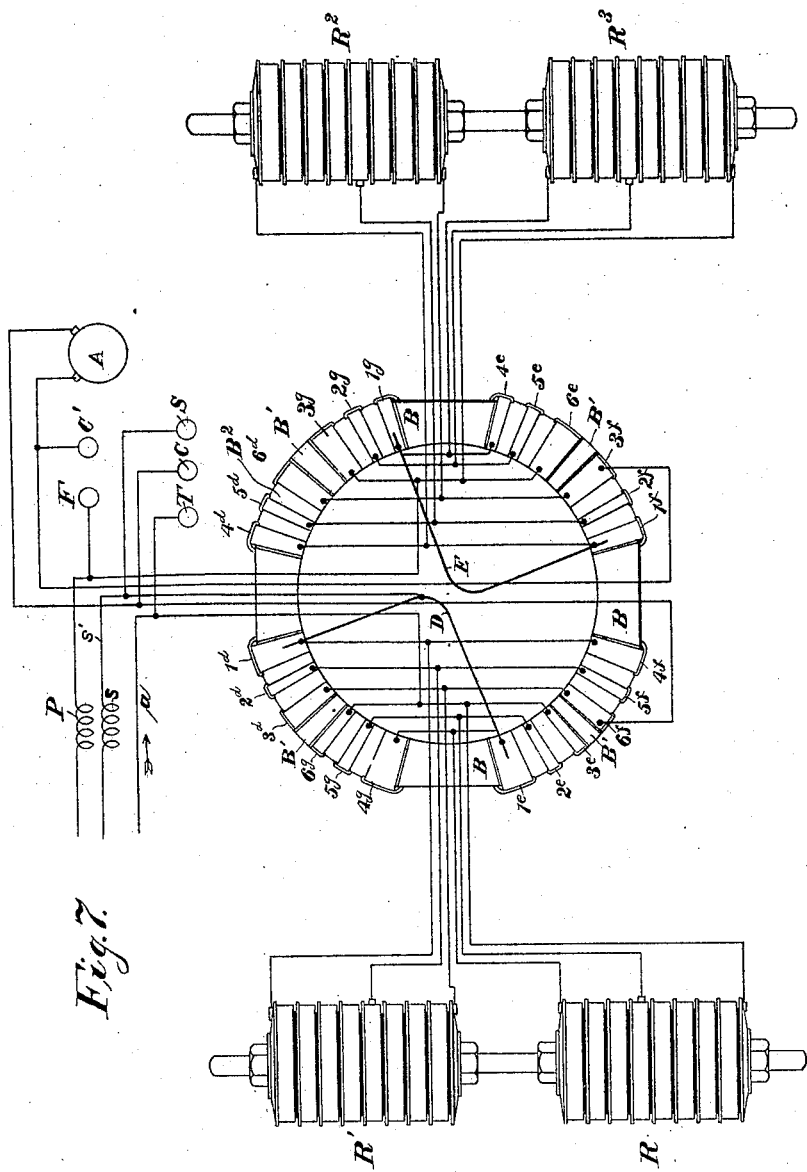
WITNESSES:
INVENTOR.
Harry P. Davis
BY
ATTORNEYS

UNITED STATES PATENT OFFICE.

HARRY P. DAVIS, OF PITTSBURG, PENNSYLVANIA, ASSIGNOR TO THE WESTINGHOUSE ELECTRIC AND MANUFACTURING COMPANY, OF SAME PLACE.

CONTROLLER FOR ELECTRIC MOTORS.

SPECIFICATION forming part of Letters Patent No. 574,885, dated January 12, 1897.

Application filed December 3, 1895. Serial No. 570,912. (No model.)

*To all whom it may concern:*

Be it known that I, HARRY P. DAVIS, a citizen of the United States, residing in Pittsburg, in the county of Allegheny and State of Pennsylvania, have invented a new and useful Improvement in Controllers for Electric Motors, (Case No. 673,) of which the following is a specification.

My invention relates to controllers for electric motors, and more particularly to controllers of the commutator type which are employed for starting, reversing, and stopping such motors as are used for operating cranes, elevators, &c.; and the invention has for its object to provide a controller of this character in which the same sets of devices are employed for inserting the necessary starting resistance and for reversing the motor and which shall be compact and durable in construction and effective in operation.

Figure 1:
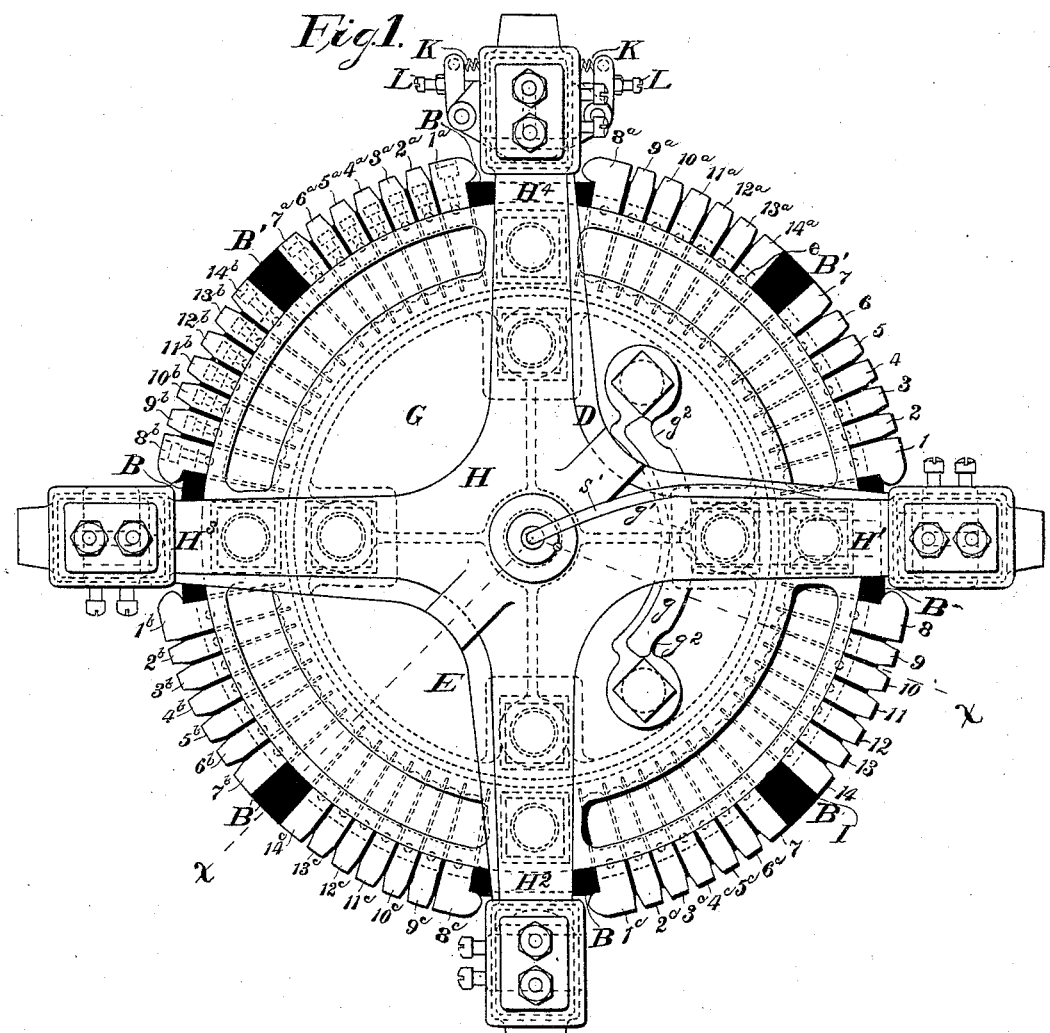
Figure 2:
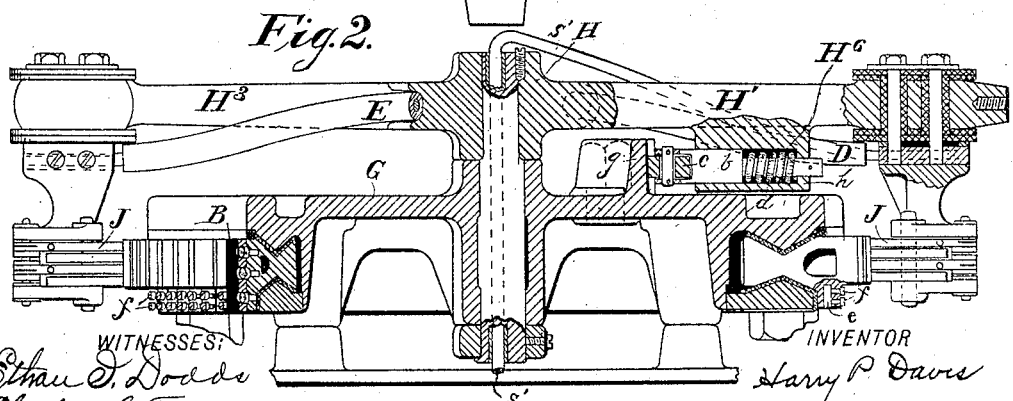

Reference being had to the drawings, Figure 1 is a plan view of the operative parts of the controller proper, the casing, resistances, and circuit connections being omitted. Fig. 2 is a section of the controller, taken on line *x x* of Fig. 1, certain parts being broken away. Fig. 3 is a diagram of the resistances, the motor, and the circuit connections between the same and the controller. Fig. 4 is a view similar to Fig. 1 of a modified form of controller. Fig. 5 is a detail vertical sectional view of one of the movable contact devices, and Fig. 6 is a horizontal detail sectional view of the same device. Fig. 7 is a diagram of the circuits in connection with the controller shown in Figs. 4, 5, and 6.

Reference being had particularly to Figs. 1, 2, and 3, A represents the commutator and armature of the motor to be controlled, P the series field-magnet coils, and *s* the shunt field-magnet coils.

T is the binding-post, through which the current is led from the generator into the controller; C, the positive armature connection; C', the negative armature connection; S, the connection for the shunt field-magnet coils, and F, that for the series field-magnet coils.

G is the stationary circular base or frame of the controller, and H is a movable head, suitably journaled in said base. The head H is provided with four arms H', H², H³, and H⁴, the arms H' H³ being in alinement and at right angles to the correspondingly-arranged arms H² and H⁴. Each of these arms is provided at or near its outer end with contact shoes or fingers J, which are pressed apart and toward the stationary member of the controller by means of springs K. Set-screws L are provided for the purpose of limiting the degree of movement which may be effected by means of the said spring. The contact-fingers, springs, and set-screws are omitted from arms H', H², and H³ in the drawings. One of the radiating arms is preferably provided with a handle in order that the head H and the connected arms may be moved in the direction and to the extent desired. This handle is omitted from the drawings, but the socket in which it may be inserted is indicated at the right in Fig. 2.

Mounted around the periphery of the circular base G are eight sets of contact blocks or pieces, each set comprising seven of such blocks or pieces. The set above and adjacent to the arm H', in the position of the latter shown in Fig. 1, are designated as 1 to 7, inclusive, and the adjacent set below the said arm as 8 to 14, inclusive. The set at the left of the arm H⁴ are designated as $1^a$ to $7^a$, inclusive, and those at the right of this arm as $8^a$ to $14^a$, inclusive. The set above and adjacent to the arm H³ are designated as $8^b$ to $14^b$, inclusive, and the set adjacent to and below this arm as $1^b$ to $7^b$, inclusive. The set at the left of arm H² are designated as $8^c$ to $14^c$, inclusive, and the set adjacent to and at the right of the said arm as $1^c$ to $7^c$, inclusive.

The adjacent blocks or contact-pieces of each set are insulated from the base G by any suitable insulating material, as indicated most clearly in Fig. 2, and are separated from each other preferably by plates of mica I. Blocks B of arc-resisting insulating material, preferably lignum-vitæ, are placed between each pair of double sets of contact-blocks in the position occupied by the arms H' H² H³ H⁴ when the latter are in the off position indicated in Fig. 1 of the drawings. Intermediate these large insulating-blocks and separating the adjacent single sets of contacts are similar narrower insulating-blocks B'. The circumferentially-arranged contact-blocks or pieces are severally provided with sockets $e$ for the reception of the ends of the cross-connectors, the arrangement and function of which will be more fully hereinafter described. Binding-screws $f$ are provided for fastening the ends of these connectors in the sockets $e$. The base G is provided at its upper side with a segmental guide $g$, this guide being provided at its ends with suitable stops, and having also adjacent to its ends curved depressions $g^2$, a corresponding depression $g'$ being also formed at its middle portion. Depending from the arm H' is a lug $h$, which is provided with a horizontal recess H⁶. In this recess is mounted a shouldered rod or pin $h$, between the shoulder of which and the end of the recess H⁶ a coiled spring $d$ is placed. In the outer end of the rod or pin $b$ is mounted a roller $c$, which bears against the guide $g$ and is pressed against the same by the spring $d$. It will be understood from this construction that by reason of the pressure of the roller $c$ against the guide $g$, when the parts are brought into the off position shown in Fig. 1, the depression $g'$, in which the roller $c$ rests, will serve to retain the parts in this position. If, however, the head is moved either to the right or to the left until the roller engages in either of the depressions $g^2$, the parts will be retained in that position until it is desired to move them.

The current is led into the controller through the conductor $a$ to the cross conductor, connecting the blocks 7ª and 14ª, as indicated in Fig. 3. The contact-fingers on the ends of arms H² and H³ are electrically connected by means of a conductor E, which is otherwise insulted from the apparatus, and the contacts on the ends of arms H' and H⁴ are connected in the same manner by means of the conductor D.

For the purpose of starting a motor I prefer to employ in connection with my controller four resistance columns or boxes, each of which is subdivided, so that the resistance may be gradually cut out in bringing the motor up to speed. While my invention is not limited to any specific form of resistance, I have found it desirable to employ the resistance covered by my Patent No. 513,457, of January 23, 1894. I have shown such resistance-columns in Fig. 3 designated, respectively, as R, R', R², and R³. The resistance-coils in each of these columns are connected in series in the manner described in the said patent. These coiled strips constituting the resistance are not specifically indicated herein, but their structure will be readily understood by reference to the said patent.

Each of the resistance-columns has eight divisions or sections designated, respectively, as $r$, $r'$, $r^2$, $r^3$, $r^4$, $r^5$, $r^6$, and $r^7$. The resistance-sections $r$, $r'$, $r^3$, $r^5$, $r^6$, and $r^7$ of column R are connected with stationary contact-blocks 1ª to 7ª and 8ª to 14ª by wires 15 to 21 and the controller cross-connectors 25. The corresponding resistances of column R' are correspondingly connected with controller contact-blocks 1 to 7 and 8ᵇ to 14ᵇ by means of wires 15ª to 21ª and the cross-connectors 24. In the same manner the corresponding resistances of column R² are connected with the contact-blocks 8 to 14 and 1ᵇ to 7ᵇ by means of the wires 15ᵇ to 21ᵇ and the cross-connectors 26, and the corresponding resistances of column R³ are connected with the contact-blocks 1ᶜ to 7ᶜ and 8ᶜ to 14ᶜ by the wires 15ᶜ to 21ᶜ and the cross-connectors 27. With this arrangement of circuits it will be understood, without following out the various changes in detail, that if the arms carrying the movable contact devices are moved from their off positions to the left, so that the conductors D and E are in the positions indicated in Fig. 3, the entire resistance of all the columns will be included in the circuit and that the current through the armature of the motor will be from the positive to the negative side. If the arms be moved one position farther, so that the movable contacts are respectively on the next stationary contact-blocks, one section of the resistance in each column will be cut out of the circuit. If this movement be continued, the resistance of each column will be gradually cut out until, when the last contact-block in each set is reached, the entire resistance will be cut out and the circuit will be from the conductor $a$, through the controller-contacts and cross-connectors, to the armature and field-magnet, without passing through any of the resistances.

If the arms H' H² H³ H⁴ be moved to the right instead of to the left, the entire resistance will be first inserted and then gradually cut, substantially in the manner above, except that the sequence of conductors and resistances in the path of the current will be varied and the flow through the armature of the motor will be from the negative to the positive side, thus reversing the direction of its rotation. It is also to be observed that the shunt field-coils of the motor are permanently connected with the conductor D by conductor $s'$, so that so long as any current is flowing through the motor the shunt-coils are in circuit, it being impossible to cut them out except by interrupting the entire circuit.

Reference being now had to Figs. 4, 5, 6, and 7 of the drawings, it will be observed that the base G, the guide $g$, the head H, arms H' H² H³ H⁴, and the conductors D and E are constructed and arranged substantially the same as the corresponding features in the form shown in Figs. 1 and 2. In this form of the invention there are also eight sets of circumferentially-arranged stationary contacts, but there are only three contacts in each set, as follows: Beginning at the left of the arm H', in the position shown in Fig. 4, the first set comprises contacts 1ᵈ 2ᵈ 3ᵈ; the next set, 4ᵍ, 5ᵍ, and 6ᵍ; the next set, 1ᵉ, 2ᵉ, and 3ᵉ; the next, 4ᶠ, 5ᶠ, and 6ᶠ; the next, 1ᶠ, 2ᶠ, and 3ᶠ;

the next, $4^e$, $5^e$, and $6^e$; the next, $1^g$, $2^g$, and $3^g$, and the next $4^d$, $5^d$, and $6^d$. Between each two double sets of contacts is placed a block B of insulating material, and alternating with these large blocks of insulating material and between adjacent sets of contacts are the smaller blocks B' of similar material. As the adjacent contact blocks or pieces of each set are separated a greater distance than the corresponding parts shown in Fig. 1, it is also necessary to insert between them blocks $B^2$ of insulating material. These contact-blocks are preferably insulated from the base G, substantially as shown in Fig. 2, and plates of mica are also employed at the sides of the contact-blocks. I also provide each one of the contact-blocks with a removable contact face-plate, these plates being fastened preferably by means of screws, as indicated in one quadrant of Fig. 4. It will also be observed that these contact-plates differ in width. The reason for this construction will be described more fully hereinafter.

Each of the arms H' $H^2$ $H^3$ $H^4$ is provided with a movable contact device, but only one, that of the arm H', is shown in the drawings. The structure of this device will be now described. It consists of a base or frame N, composed mainly or wholly of magnetizable metal, to the opposite sides of which are pivoted the contact-fingers J'. A wire spring K' is fastened to both of these fingers in such manner as to tend to separate them and thus throw their contact-ends outward against the stationary contact-plates. This outward movement of the fingers J' is limited by means of suitable adjusting-screws L'. Around a portion of each frame N is wound a coil M, one end of which is connected to the corresponding pair of contact-shoes and the other end to either the conductor D or the conductor E, as the case may be, so that the current traversing the controller necessarily passes through these coils. The frame N is extended at both sides partially around the contact-fingers and terminates in pole-pieces N' N', adjacent to the contact-ends of the fingers. Each of these pole-pieces is provided with a protecting sheath $N^2$ of insulating material, so that there may be no danger of electrical contact between the pole-pieces and the stationary contacts of the controller. It will be apparent from this construction that the lines of force set up by means of the coil M passing between these pole-pieces N' will serve to extinguish any arc which may form upon the breaking of the circuit between the movable and stationary contacts of the controller.

Referring now particularly to Fig. 7 of the drawings, the resistance-columns R, R', $R^2$ and $R^3$ are the same in structure and arrangement as those shown in Fig. 3, except that each column has only three wires leading therefrom to the controller, instead of 7, as in Fig. 3. The gradual cutting out of the resistance is effected in this form of device by reason of the difference in width of the stationary contacts. For example, if the arms be moved to the left until each movable contact engages with the first stationary contact of its set, the entire resistance will be in circuit and the current through the armature of the motor will be from the positive to the negative side. It will be observed, however, that the arm $H^2$ may be moved until its contact engages with the stationary contact $2^g$ before the other movable contacts have left the corresponding contacts $1^d$, $1^e$, and $1^f$. This, it will be seen, will serve to cut out approximately one half of the resistance in column $R^3$. A slight farther movement in the same direction will bring the movable contact on arm $H^3$ into engagement with the contact $2^f$, the other movable contacts on arms H' and $H^4$ being still in engagement, respectively, with the contacts $1^d$ and $1^e$. This will serve to cut out approximately one half of the resistance in the column $R^2$. The farther movement will serve to connect the movable contact of arm H' with the stationary contact $2^d$, the other movable contacts being respectively on the stationary contacts $1^e$, $2^f$, and $2^g$. This will serve to cut out not only approximately one half of the resistances of columns $R^2$ and $R^3$, but also approximately one half of the resistance of column R'. A farther movement will bring the movable contact of arm $H^4$ into engagement with the stationary contact $2^e$, when the movable contacts of all of the arms will be upon the secondary stationary contacts of their respective sets, thus cutting out approximately one half of the resistance of each of the resistance-columns.

Without following out in detail the next series of steps, it will be understood that the second half of resistance-column $R^3$ will be first cut out, then the second half of resistance-column $R^2$, then the second half of resistance-column R', and, finally, the second half of resistance-column R, all being cut out when the movable contacts are in engagement with the third stationary contacts of the respective sets. In the same manner if the movable contacts be moved to the right from their neutral positions instead of to the left, the motor-armature will be reversed in direction and the resistance will be first entirely inserted, then gradually cut out, as hereinbefore described.

I claim as my invention—

1. In a controller for electric motors, the combination with circumferentially-arranged sets of stationary contact blocks or pieces, and a centrally-mounted head, movable a limited distance from neutral position in either direction and having radial arms provided with contacts at their outer ends electrically connected in pairs, of a plurality of resistances each permanently connected to two sets of contact-blocks.

2. In a controller for electric motors, the combination with eight sets or groups of circumferentially-arranged contact-blocks, of a centrally-mounted head having radial arms provided with contacts electrically connected in pairs, said head and arms being movable a sufficient distance to effect the engagement of each of said movable contacts with two sets of stationary contacts, and four sectional resistances each permanently connected to two sets of contact-blocks.

3. In a controller for electric motors, the combination with eight sets or groups of circumferentially-arranged contact-blocks, the contact-blocks of correspondingly-located sets being electrically connected in pairs, of a rotatable member having four contacts electrically connected in pairs, and a plurality of resistances connected to said pairs of stationary contact-blocks whereby a movement of the rotatable member in either direction will first insert the entire resistance and then gradually cut it out.

4. In a controller for electric motors, the combination with sectional resistances and a plurality of double sets of stationary contacts connected in pairs to said resistances, of a rotatable member having a contact for each double set of stationary contacts, said movable contacts being electrically connected in pairs and the amount of resistance included in the circuit being controlled to the same degree by moving the rotatable member either to the right or to the left.

5. A switch-contact device comprising a base, two fingers pivoted thereto at their outer ends and overlapping at their inner ends, a spring tending to separate said overlapping ends and adjustable means for opposing the action of the spring.

6. A switch-contact device comprising a magnetizable base, a pair of overlapping fingers pivoted thereto, a spring tending to separate said fingers, and a magnetizing-coil on said base, said base having pole-pieces projecting in proximity to the contact portions of said fingers.

7. In a controller for electric motors, a plurality of circumferentially-located contact-pieces arranged in groups or sets and varying in width whereby the number of circuit changes is increased.

8. In a controller for electric motors, a plurality of sets of stationary contact-blocks circumferentially arranged, each of said contact-blocks being provided with a removable face-plate, in combination with a plurality of rigidly-connected movable contacts, one for each two sets of stationary contacts, said movable contacts being electrically connected in pairs.

9. The combination with a plurality of sets of circumferentially-arranged stationary contacts, of a plurality of movable contacts, electrically connected in pairs and mechanically connected to be moved at the same time over the stationary contacts adjacent thereto and resistances permanently connected to said stationary contacts in pairs.

10. A controlling means for electric motors comprising stationary contacts, resistances, electric connections between said devices and between the stationary contacts and the motor and a single set of movable contacts electrically connected in pairs, the engagement of said movable and stationary contacts serving both for inserting and cutting out the resistance and for reversing the motor.

11. A controller of the commutator type for electric motors, having stationary contacts arranged in groups, in combination with a member having a plurality of contacts electrically connected in pairs and movable in either direction from its initial position to insert and progressively cut out resistance, the direction of movement of said member with reference to said initial position determining the direction of rotation of the motor-armature.

In testimony whereof I have hereunto subscribed my name this 29th day of November, A. D. 1895.

HARRY P. DAVIS.

Witnesses:
   WESLEY G. CARR,
   HUBERT C. TENER.